March 28, 1967 W. A. KAIER 3,311,086

APPARATUS FOR TROWELING

Filed Nov. 4, 1963

INVENTOR
WILLIAM A. KAIER

BY
ATTORNEYS

United States Patent Office 3,311,086
Patented Mar. 28, 1967

3,311,086
APPARATUS FOR TROWELING
William A. Kaier, 151 T Whitesville Road,
Toms River, N.J. 08753
Filed Nov. 4, 1963, Ser. No. 321,158
2 Claims. (Cl. 118—120)

My invention relates to a device for layering paste-like substances, and more particularly to an apparatus for effecting rapid, smooth "troweling" of pasty core materials in the process of laminating strong, lightweight panels as in pleasure boat hulls, cabin panels, etc.

It is well known in the art of pleasure boat manufacture to utilize various combinations of fiberglass roving and lightweight core materials for boat hulls, decks, panels and such, the core materials absorbing the applied stresses while the fiberglass provides an ornamental or decoratable exterior surface as well as additional reenforcement. In recent years there has been extensive development of "sandwich" or laminated constructions employing a core material between fiberglass skins, in superposed laminations as desired to obtain a desired thickness, whereby contoured or planar panels having adequate strength characteristics may be formed without undue weight.

My invention relates to a method and apparatus for forming laminated boat hulls, decks and the like wherein the lamination of a "micro-balloon" resin mix and fiberglass sheets are quickly processed to provide uniform density layers of maximum strength and also of uniformly smooth contour without surface irregularities which would normally detract from both the appearance and structural quality of the panel.

It is well known to produce boat hulls and decks of varied combinations of fiberglass and core material wherein the fiberglass is basically used as the protective covering material, wherein the core materials carry the major stresses. Thus, it is recognized that a fiberglass laminate has a lower modulus of stiffness than other competitive materials such as wood and metals. Fiberglass itself is much more flexible than when in a combination with other materials such as wood, metal or other plastics. It has been further found that by using a "sandwich" of core material, placed between fiberglass skins, the section stiffness of the panel is increased without undue addition of weight.

Various different core materials have been employed such as balsa wood, plywood, "Masonite," pressed pulpwood and glued veneers, but the chief difficulty heretofore with these cellulose-base core materials has been that they must be properly sealed from water and moisture to preclude excessively rapid decomposition or rot thereof. Therefore, very great care must be taken to seal off any "pin holes" or other passageways where water can seep in the core and cause deterioration. Also used as core materials have been skeleton or honeycomb structures of various designs, which while providing a light-weight sandwich, have been discounted by the industry due to their lack of required impact strength and also their susceptibility to water migration problems through the cell structures when breaks in the fiberglass skin occur. Expanded foam core systems (i.e. polystyrene) have been found to be very expensive for expanded in-situ methods of manufacture, and are necessarily uneconomic for the smaller quantity boat builders.

The most recent development in sandwich or core material products to be used in conjunction with fiberglass in the construction of pleasure boat hulls, decks, and panels has been a mixture of "microballoon" material with an epoxy or polyester resin which together form a high-strength, relatively high-density core material. One such "microballoon" material is exemplified by Veatch Patent 2,797,201.

Microballoons comprise tiny hollow spheres of phenolic resin containing nitrogen gas, and are normally mixed with the resin or epoxy to form a paste which may be applied between fiberglass sheets. Such a paste mix, when hardened, is of anti-decomposition quality to provide an excellent sandwich or core material. A significant problem encountered in the use of this paste has been finding a suitable method of application thereof in panel lamination. The methods in use today involve tedious hand troweling or "buttering," which apart from the high labor cost thereof, tends to leave a wavy or uneven surface upon which to apply the next layer of laminate thus creating varying panel thicknesses and core densities between various areas of each layer.

It is therefore a principal object of my invention to provide an apparatus for effectively troweling the microballoon mix onto panels in the lamination process of forming fiberglass "sandwiches" to produce a strong structure of uniform density and thickness.

A further object of my invention is to provide an apparatus which will spread the resin mixture upon the surface by means of a high speed oscillating or orbiting motion tool to thereby produce even density layers having a relatively smooth external surface.

Another object of the present invention is to provide an apparatus of wheeled character which carries an oscillating or orbiting trowel to make the applied surface of pre-set resin uniform in density and depth with equal distribution of the "microballoons" within each layer of laminate, and wherein the desired thickness thereof may be readily varied.

Other objects and advantages of my invention will become apparent from the following detailed description taken in connection with the accompanying drawings, in which.

Figure 1:
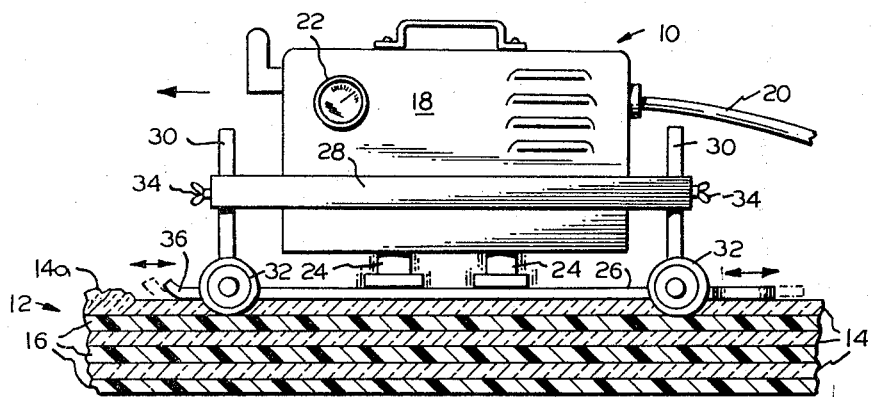
FIG. 1 is a side elevation of my apparatus illustrated in the process of use, the thickness of the laminated panel being somewhat enlarged for clarity.

Referring to the drawings, I show at 10 my troweling apparatus in operation on a composite built-up laminated surface 12 of the character hereinafter described. As illustrated, the surface comprises a plurality of built-up layers of microballoon resin mix 14 interlaced with fiberglass sheets 16. As shown in FIG. 1, the apparatus 10 is in the process of troweling the microballoon resin mix of an uppermost layer 14a to form a smooth, uniform density layer to which a subsequent fiberglass sheet will be overlaid and bonded.

Figure 2:
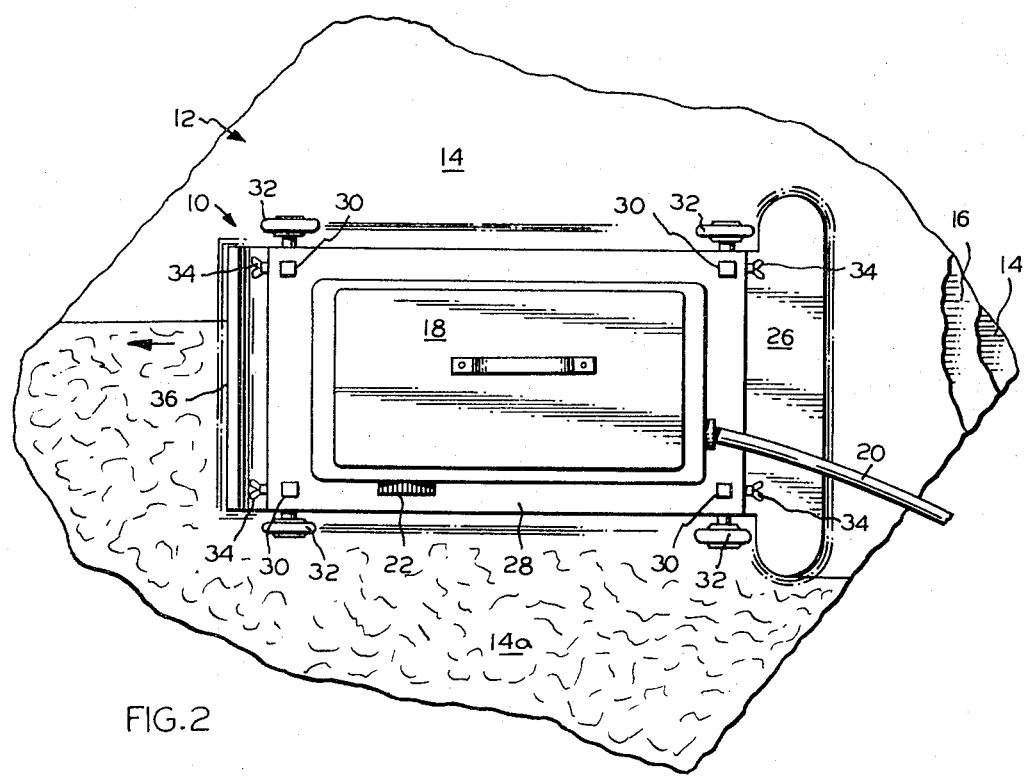
FIG. 2 is a top plan of my apparatus shown in FIG. 1.

My apparatus includes a motor housing 18 which includes an internal electric motor, external power source connection 20 and the usual on-off variable speed control switch 22. The output of the motor is transmitted to the depending drive shaft assemblies 24 which are rapidly revolved about narrow-diameter orbits at relatively high speed. Such oscillating or orbiting motors of relatively small size are readily commercially available and are of the character, for example, commonly present in industrial or household power sanding tools. Attached to the orbiting drive shafts 24 is the trowel 26 which in the preferred form of the invention preferably comprises a plate of substantially T-form in plan as seen in FIG. 2. The plate 26 is of sufficient thickness to be substantially rigid, and by virtue of being affixed to the drive posts 24 by screws or the like, the plate will likewise be reciprocated or orbited longitudinally of the apparatus as relatively high speed.

Affixed to the motor housing 18 is a perimetral frame 28 which carries at the respective corners thereof four wheel posts 30, each having a small wheel 32 at the lower end thereof. The several wheel posts may be adjustably vertically positioned within the frame 28 as by means of clamp screws 34, whereby the clearance between the bottom of the wheels and the underside of the troweling plate 26 can be predetermined as desired for the thickness of the troweling to be accomplished.

It will be seen that the laterally extending rearmost portions of the trowel plate 26 project beyond the paths of travel of the wheels, whereby as the unit 10 is advanced in a forward direction by the operator in troweling the heap 14a of microballoons forwardly thereof, the trowel plate 26 will smooth over and effectively eliminate the wheel tracks.

In operation of the preferred form of my apparatus herein disclosed, a quantity of microballoon resin mix 14a is ladeled or deposited upon the hull or other surface portion to be built up. In the example shown in the drawings, a third layer is being formed on the panel.

Thereafter, the wheels 32 of the troweling device 10 are adjusted to the desired elevation relative to the underside of the troweling plate 26, which latter may be of aluminum which may be provided with Teflon undersurface to minimize sticking and accordingly maximize the ironing or troweling action between the plate and the microballoon mix. The apparatus 10 is then placed on the previously built up portions of the panel, the wheels 32 thereof sinking through the newly applied microballoon mix to rest on the firm uppermost surface of the previously layered laminations. The motor is then started, causing the troweling plate 26 to rapidly oscillate or describe a narrow curvilinear orbit. As the device 10 is slowly manually propelled across the panel, as from shear to shear, the same will be flattened out by the oscillating trowel plate as the curved leading edge 36 engages the irregular mix forwardly of the machine, and will be ironed and smoothed very firmly beneath the plate 26 as the apparatus passes thereover. As above stated, the laterally extending portions of the trowel plate 26 disposed rearwardly of the wheel travel path, will smooth and compact the microballoon mix into the wheel paths to fill up the same.

In this manner the entire panel section can be uniformly and smoothly troweled to achieve regular density of mix and a level external surface with a minimum of labor. Thereafter the fiberglass sheets are overlaid on the mix in known fashion, smoothed with a squeegee or the like, and the same is permitted to harden to form a succeeding built-up layer.

The apparatus, though simple in construction as herein described, eliminates the tedious hand troweling presently required in microballoon lamination wherein it is exceedingly difficult and/or time-consuming to achieve a reasonably uniform layer without having irregularities or swells and valleys therein of differing depth when done by hand. The elimination of this hand labor materially reduces the cost in manufacturing laminated microballoon fiberglass assemblies for boat hulls and the like, as well as achieving the desired uniformity of production resulting in a finer quality product.

While I have shown a preferred form of my apparatus which capably achieves the objects of my invention, it is apparent that modifications may be made therein without departing from the spirit and scope of my invention. Thus, the trowel plate 26 may be of a contour other than planar when the surfaces to be troweled possess relatively sharply curved contours, while the plan outline of the trowel blade could be likewise modified depending upon the particular use contemplated. Likewise the apparatus could be self-propelled, although manual control thereof permits greater flexibility for a majority of applications. Similarly, although it is preferable to initially ladle the web microballoon mix onto the surface, a suitable dispensing hopper for the same could be provided as an attachment thereto.

Further, while I have shown in the drawings a built-up surface of alternate woven sheet and microballoon layers, it is apparent that a number of panels and like structures constitute only a single microballoon core having layered on either side thereof the fiberglass or similar mat material, which single-sandwich construction may equally as well be fabricated according to the teachings of my invention, wherein the initial layer of single or multiple thickness cloth may be laid upon a rigid surface or form, the microballoon-resin mix placed thereon and trowelled as aforesaid, and the final cloth-like mat overlaid thereon to form a single-core panel.

What I claim is:

1. A troweling apparatus for smoothly layering a pasty mix comprising a housing having drive posts projecting downwardly therefrom, a substantially planar troweling plate secured to said posts, said plate including a central elongated portion underlying said housing and transverse laterally extending portions at one end thereof to define a substantially T-outline, a plurality of wheels for supporting said housing, means mounting said wheels for vertical adjustment relative to said housing and plate to determine ultimate thickness of the pasty mix, said means locating said wheels on opposite sides of said plate central portion and within the path of said transverse plate portions, and means for driving said drive posts to impart cyclical translational movement to said plate in the plane thereof, whereby as said apparatus is propellel along the pasty mix, said troweling plate will level and smooth the same and said transverse portions thereof will level and smooth the mix to erase the wheel tracks therein.

2. A troweling apparatus for smoothly layering a pasty mix, comprising
   a housing,
   drive posts projecting from the underside thereof,
   motor means for imparting uniplanar cyclical translational motion to said drive posts,
   a substantially rigid plate secured to said posts, said plate having a troweling undersurface,
   wheel supporting frame means on said housing,
   vertical posts carrying said wheels adjustably received within said frame means, said plate including portions at one end thereof extending laterally to peripheral points outwardly of said wheels, whereby said plate portions travel over and eliminate wheel tracks formed in said mix as the apparatus is propelled thereover.

References Cited by the Examiner

UNITED STATES PATENTS 2,754,732   7/1956   Beyer _____ 94—45

EARL M. BERGERT, *Primary Examiner.*

T. R. SAVOIE, *Assistant Examiner.*